(12) United States Patent
Teller

(10) Patent No.: US 6,590,833 B1
(45) Date of Patent: Jul. 8, 2003

(54) ADAPTIVE CROSS CORRELATOR

(75) Inventor: Harold J. Teller, Lebanon, CT (US)

(73) Assignee: The United States of America as represented by the Secretary of the Navy, Washington, DC (US)

(*) Notice: Subject to any disclaimer, the term of this patent is extended or adjusted under 35 U.S.C. 154(b) by 0 days.

(21) Appl. No.: 10/214,548

(22) Filed: Aug. 8, 2002

(51) Int. Cl.[7] .............................. G01S 3/80
(52) U.S. Cl. .................. 367/125; 367/124; 367/901
(58) Field of Search ........................... 367/901, 905, 367/125, 124

(56) References Cited

U.S. PATENT DOCUMENTS

| | | | | |
|---|---|---|---|---|
| 3,882,498 A | * | 5/1975 | McGuffin | 342/91 |
| 4,270,179 A | * | 5/1981 | Sifford et al. | 708/422 |
| 5,016,261 A | * | 5/1991 | Amoroso et al. | 375/317 |
| 5,416,532 A | * | 5/1995 | Ko | 348/665 |
| 5,526,347 A | * | 6/1996 | Chen et al. | 370/290 |
| 5,852,567 A | * | 12/1998 | Xia et al. | 708/400 |
| 5,889,864 A | * | 3/1999 | Smith et al. | 713/170 |
| 5,901,343 A | * | 5/1999 | Lange | 455/63 |
| 5,978,473 A | * | 11/1999 | Rasmusson | 379/406.08 |
| 5,999,574 A | * | 12/1999 | Sun et al. | 375/326 |
| 6,130,643 A | * | 10/2000 | Trippett et al. | 342/380 |

* cited by examiner

*Primary Examiner*—Ian J. Lobo
(74) *Attorney, Agent, or Firm*—James M. Kasischke; Michael F. Oglo; Jean-Paul A. Nasser

(57) ABSTRACT

A system and method are provided for an adaptive filter that is especially useful for sonar signal processing. The beam outputs of a conventional beamformer are provided as inputs to adaptive notch filters in accord with the present invention. The outputs of the plurality of adaptive notch filters are applied to a standard cross correlation process. In each of the adaptive notch filters, the beam outputs are split into two paths and in one path are applied directly to a signal combiner. In the second path, the beam outputs are delayed. The delayed beam outputs are applied to an adaptive finite impulse response filter, the output of which is an estimate of the narrowband interference contained within the beam output. The narrowband interference is then suppressed in the signal combiner prior to application to the standard cross correlation process.

12 Claims, 3 Drawing Sheets

ADAPTIVE CROSS CORRELATOR

STATEMENT OF THE GOVERNMENT INTEREST

The invention described herein may be manufactured and used by or for the Government of the United States of America for Governmental purposes without the payment of any royalties thereon or therefore.

CROSS REFERENCE TO OTHER PATENT APPLICATION

Not applicable.

BACKGROUND OF THE INVENTION

(1) Field of the Invention

The present invention relates generally to systems and methods for a cross-correlator and, more specifically, for an adaptive cross-correlator operable for adaptively suppressing high signal to noise ratio (SNR) narrowband interference before the interference enters the cross-correlator process.

(2) Description of the Prior Art

A vessel's sound signature contains both a continuous, broadband spectrum of sound, as well as discrete, narrowband tonals at specific frequencies along that spectrum that rise above the spectrum. The tonals may be caused by specific pieces of rotating machinery within the vessel. For instance, narrow band tonals may be produced by pumps, generators, and gears, whereas the continuous broadband spectrum is caused primarily by flow noise over the hull surface or by propeller cavitation. However, narrowband tonals or narrowband interference may also be produced by self noise related to a loud platform, such as the platform to which the sonar array is attached. Other narrow band tonals or narrowband interference may be produced by other vessels unrelated to the target vessel.

A vessel's broadband signature may resemble background noise in that it contains a continuous spectrum of frequencies within which sound source levels at particular frequencies rise and fall in random fashion around a mean over time. By contrast, the narrowband component of a vessel's signature may generate sound at several specific frequencies continuously. Thus, compared to the background noise generated at these specific frequencies, which will average out over time to x, the signal plus noise received at the tonal frequency will average out over time to x+y, with y being the source level of the signal.

At close range, a simple sonar will detect a vessel's broadband signal simply by pointing the main beam of its array at the vessel. The sonar is measuring all the sound it receives in a given direction, including both signal and background noise, and as it points in the direction of the target, the signal increases. As the range of the opposing submarine is increased, the relative strength of this broadband signature compared to the broadband background noise declines until it is drowned out and the signal-to-noise ratio drops below the detection threshold. Therefore, self-noise is also an important issue for sonar effectiveness. This is true whether one is seeking broadband or narrowband detections.

In some cases, two important tonals in a submarine's signature may be those modulated by the propeller at the rate which its blades turn, and those associated with particular items of rotating machinery. Blade rate tonals are usually slightly lower in frequency than machinery tonals, and both tonals are usually aspect dependent and speed dependent. Taken together, these tonals provide means to detect targets, classify them, and to track them over time.

High signal to noise ratio narrowband interference creates signal distortion and makes peak detection more difficult for received sonar signals. Removal or suppression of narrowband interference is not a new idea. The current methods for removal or suppression of narrowband interference from signals received by an array of sonar transducers utilize what is referred to as the smooth coherence transform (SCOT). More detailed information about SCOT methods can be found in references such as *Coherence and Time Delay Estimation*, by G. Clifford Carter, IEEE Press, Piscataway, N.J., 1992. SCOT works in the frequency domain and essentially applies a filter on the output of the frequency domain correlator implementation. However, SCOT tends to be computationally intensive. The number of floating point operations required per update are of order M×N where N is 1024 or greater and M is the number of beam pairs. It would be desirable to provide a significant reduction in processing throughput as compared to the SCOT method. It has also been shown that in the presence of noise and wide band signals only, SCOT will have reduced performance over a cross correlator without SCOT processing (standard cross correlator). It is would therefore be desirable to provide an adaptive cross correlator that will perform no worse than the standard cross correlator in the presence of wide band signals and noise.

Various inventors have attempted to solve related problems as evidenced by the following patents:

U.S. Pat. No. 5,724,485, issued Mar. 3, 1998, to David Rainton, discloses an adaptive cross correlator apparatus with a first receiving section that receives a signal and outputs the received signal as a first signal, and a second receiving section that receives a further signal and outputs the received further signal as a second signal, wherein the second receiving section is provided at a position different from that of the first receiving section. A first filter filters the first signal with a first changeable transfer function and outputs a filtered first signal, and a second filter filters the second signal with a second changeable transfer function and outputs a filtered second signal. Further, a cross correlator calculates a cross correlation value by using a predetermined cross correlation function based on the filtered first and second signals, and then, an adaptive controller calculates a discriminant function value representing a misclassification measure of the first and second signals, based on the cross correlation value and a true delay between the first and second signals, and adaptively adjusts the respective first and second transfer functions of the first and second filters so that the calculated discriminant function value becomes a minimum.

U.S. Pat. No. 5,899,864, issued May 4, 1999, to Arenson et al., discloses the energy, power or amplitude of Doppler or time shift information signals that is compared to a threshold in order to select a large or small weighting factor for temporal persistence. In the event of a "flash" signal or strong arterial flow signal, a small weighting factor is chosen to reduce the extent of temporal persistence via feedback of the averaged value for the prior frames so that the effect of the "flash" or strong flow signal would quickly dissipate in the imaging of subsequent frames and good temporal resolution preserved for the current frames, while low energy flow signals would cause a large weighting factor to be selected to improve the signal-to-noise ratio of low energy signals. Similar effects can be achieved by clipping the signals to not exceed a certain threshold.

U.S. Pat. No. 6,130,643, issued Oct. 10, 2000, to Trippett et al., discloses an antenna nulling system for nulling a jamming signal having a multibeam antenna, a correlator, and antenna pattern calculator, a sequential updater and a beamformer. The multibeam antenna includes a plurality of antenna elements and is operable to receive the plurality of signals. The correlator is operable to receive at least one sample signal from one of the antenna elements and a composite signal from the plurality of antenna elements. The correlator determines a cross-correlation of the sample signal and the composite signal. The antenna pattern calculator calculates a difference in pattern magnitude of an adapted antenna pattern and a quiescent antenna pattern of the multibeam antenna. The sequential updater sequentially calculates a new weight for each of the antenna elements based upon an existing weight of each antenna element, the cross-correlation and the difference in pattern magnitude. The beamformer is in communication with the multibeam antenna and the sequential updater to combine a new weight for each of the antenna elements with the plurality of signals received from the multibeam antenna to null the jamming signal.

U.S. Pat. No. 5,978,473, issued Nov. 2, 1999, to Jim Agne Jerker Rasmusson, discloses a measure of a degree of convergence in an adaptive filter arrangement that is derived from the comparison of an amount of adaptation occurring in the adaptive filter arrangement, over a predetermined period of time, with a normalizing value accumulated for the same period. Supplemental signal processing may be invoked, modified or withdrawn based upon the degree of convergence indicated.

U.S. Pat. No. 5,901,343, issued May 4, 1999, to Julius Lange, discloses an intermediate frequency adaptive cross polarization interference canceller for processing an interfering cross polarization signal distorted by dispersion. The canceller has right and left inputs for respectively receiving right and left polarized IF input signals. A plurality of serially coupled complex multiplier and control stages respectively process the right and left polarized signals to provide controlled amounts of coupling between them to cancel cross polarization interference therebetween. A plurality of delay lines add predetermined time shifts to the right and left polarized signals between stages, and which forms a transversal filter having a predetermined number of taps. The canceller outputs right polarized IF output signal and a left polarized IF output signal having substantially no cross polarization interference therebetween. A preferred embodiment of the adaptive cross polarization interference canceller uses a compensating five-tap transversal filter disposed in the cancellation path. A simplified single tap adaptive cross polarization interference canceller may be used if there is no dispersion.

U.S. Pat. No. 5,852,567, issued Dec. 22, 1998, to Xia et al., discloses an iterative time frequency algorithm which filters noisy wide band/nonstationary signals by projecting the noisy signal into the TF domain, masking the TF response, computing the inverse TF transform to extract a filtered signal, and repeating these steps until the projection lies within the mask. As a result, the TF domain properties of the extracted signal are substantially equal to the desired TF domain properties. Furthermore, the iterative approach is computationally simple because it avoids inverting matrices. The TF transform and its inverse must be selected such that the iterative algorithm is guaranteed to converge. Candidate transform pairs can be tested on known data, and if the TF transforms converge to the desired TF properties, the candidate pair can be selected. Alternately, the candidate pairs can be tested against a sufficient convergence condition, and if they satisfy the condition within an acceptable tolerance, they can be selected with confidence. Furthermore, the sufficient convergence condition can be solved directly to provide the TF transform and its inverse.

U.S. Pat. No. 5,526,347, issued Jun. 11, 1996, to Chen et al., discloses a sign-based decorrelation detection and adaptive control arrangement which includes structure for detecting cross-correlation between a far-end signal and an echo residual following a balance filter. During the adaptive process, if the detected correlation value is below a certain threshold, indicating that the two signals are decorrelated, the adaptation of the balancing filter is stopped. At such a point, proper echo cancellation has been achieved. Conversely, when the detected correlation value exceeds a threshold, the adaptation is continued until the correlation value falls below the threshold again. In any event, such decorrelation controllers are able to detect signal decorrelation and to control adaptation even in the presence of a double-talker condition.

U.S. Pat. No. 5,416,532, issued May 16, 1995, to Jung W. Ko, discloses horizontal and vertical peaking signals that are separated from a video signal by combining variously delayed responses to the video signal. A cross-fader combines the separated horizontal and vertical peaking signals in proportions determined by a cross-fader control signal. A correlator responds to ones of the variously delayed responses to the video signal for generating an output signal representative of the relative degrees of vertical and horizontal correlation in the video signal. The correlator output signal addresses a read-only memory that supplies the cross-fader control signal. The adaptively generated peaking signal is suitable for adjustably peaking a luminance component extracted from the video signal, where that video signal is a composite signal also including a chrominance component. The extraction of the luminance component is preferably done on an adaptive basis, generating horizontal and vertical comb filter responses by suitably combining the variously delayed responses to the video signal and, with a further cross-fader, combining the horizontal and vertical comb filter responses in proportions determined by the cross-fader control signal.

U.S. Pat. No. 5,016,261, issued May 14, 1991, to Amoroso et al., discloses a method and apparatus for improving the anti-jam performance of a processing circuit to increase conversion gain and reduce small signal suppression resulting from processing a phase modulated input signal accompanied by jamming interference. Input signals are each segregated into signal chips by a matched filter, and by an adaptive threshold circuit in accordance with a predetermined relative threshold. The threshold is set to repeatedly distinguish a predetermined number of signal chips having greater signal amplitude. The absolute amplitude threshold level may, therefore, vary in accordance with the particular signal chips forming each input signal segment. A phase quantizer operates to extract phase information from the signal chips. A phase correlator operates to apply a first weighting gain factor to signal chips equal to or exceeding the threshold, and a second weighting gain factor to the remaining chips, the first weighting gain factor being greater than the second weighting gain factor.

U.S. Pat. No. 4,270,179, issued May 26, 1981, to Sifford et al., discloses a complex ternary correlator and method for adaptive gradient computation in an adaptive equalizer which includes four ternary operation circuits, four ternary multiplier circuits for obtaining the cross products of the ternary operation outputs, a subtractor circuit for developing a signal commensurate with the difference between two of the ternary multiplier outputs, an adder circuit for developing a signal commensurate with the sum of the remaining two ternary multiplier outputs and two identical integrating circuits for obtaining the real and imaginary adaptive tap coefficient update increments in an adaptive equalizer.

U.S. Pat. No. 3,882,498, issued May 6, 1975, to August L. McGuffin, discloses an AMTI adaptive array in which each array antenna element is connected to an element circuit which multiplies the contribution of each antenna element to the total return m by a weight. The element circuits and further signal processing circuitry comprise the array processor. The element circuits include well-known cross correlator control loops. A signal whose pulse repetition interval to pulse repetition interval Doppler phase shift is 180° out of phase with clutter returns is supplied to a control loop. Thus even with clutter at or near the look angle, main lobe gain is maintained. Consequently, a "two pulse" MTI circuit utilizing a single delay line in each element circuit may be utilized rather than a two delay line element circuit which would normally be required to provide a signal to noise ratio value indicative of main lobe gain which would be required for compatibility with further MTI processing circuitry.

The above patents do not provide an adaptive crosscorrelator that requires no feedback from the correlator output or any prior knowledge of the expected process output. Consequently, there remains a long felt but unsolved need for an adaptive filter to suppress high signal to noise ratio narrowband interference while preserving the broadband energy before the signal enters the cross-correlation process. Those skilled in the art will appreciate the present invention that addresses the above and other problems.

SUMMARY OF THE INVENTION

Accordingly, it is an objective of the present invention to provide an improved sonar signal processing system and method.

Another objective is to provide a system and method as aforesaid which is operable to estimate narrowband interference in each of a plurality of beam signals and then subtract the estimated narrowband interference from each respective beam signal to thereby provide a plurality of filtered beam signals containing suppressed narrowband interference for application to a cross correlation processor.

A further objective is to provide a system and method as aforesaid whereby the narrowband interference is suppressed without the need of feedback from the cross correlation processor to which the filtered beam signals are applied.

These and other objectives, features, and advantages of the present invention will become apparent from the drawings, the descriptions given herein, and the appended claims. However, it will be understood that above listed objectives and advantages of the invention are intended only as an aid in understanding aspects of the invention, are not intended to limit the invention in any way, and do not form a comprehensive list of objectives, features, and advantages.

In accordance with the present invention, a system is provided for a sonar signal detection system that may comprise one or more elements such as, for instance, a plurality of sonar sensors, and/or a beamformer for receiving acoustic signals from the plurality of sonar sensors. The beamformer preferably produces a plurality of beam outputs. The beam outputs, x(n), have narrowband signal components $\hat{S}_{NB}(n)$ and wideband signal components. A plurality of adaptive filters receive the plurality of beam outputs. Each of the plurality of adaptive filters has a delay component providing a delay, D, operable for decoupling the wideband signal component from the original wideband signal component. An adaptive notch filter is utilized to allow passage of the narrowband signal component and to suppress the wideband component. The delayed, notch filtered signal is then subtracted from the original signal and provided to a cross correlation processor. The plurality of adaptive filters are preferably operable without feedback from the cross correlation processor.

The system may further comprise a finite impulse response (FIR) filter for receiving the delayed narrowband signal, the delayed wideband signal, and the delayed ambient noise signal. The FIR filter output of each the FIR filters may be of the form:

$$\hat{S}_{NB}(n) = \sum_{k=0}^{P-1} h(k) * x(n-k-D), \quad (1)$$

wherein h(k) comprises a plurality of filter coefficients.

In a preferred embodiment, the plurality of filter coefficients are adjusted recursively using a least mean squares (LMS) method of the form:

$$h_n(k) = h_{n-1}(k) + \Delta * (x(n) + \hat{S}_{NB}(n)) * x(n-k-D), \quad (2)$$

where $$0 < \Delta < 1/(N*10*\sigma_x^2) \quad (3)$$

where $\sigma_x^2$ is an estimate of power in input signal x(n).

In operation, a method for processing sonar signals may comprise one or more method steps such as, for instance, utilizing a beamformer to produce a plurality of beam outputs, and splitting each of the plurality of beam outputs into a first path and a second path. In the first path, the method preferably comprises applying the plurality of beam outputs to a plurality of signal combiners, and in the second path, the method comprises delaying the plurality of beam outputs with respect to time to produce a plurality of delayed beam outputs. Other steps may comprise applying the plurality of delayed beam outputs to a plurality of adaptive notch filters to produce a plurality of adaptive notch filter outputs, applying the plurality of adaptive notch filter outputs to the plurality of signal combiners, and producing a plurality of signal combiner outputs for application to a cross correlation processor.

In a preferred embodiment, the method may comprise producing the plurality of signal combiner outputs without feedback from the cross correlation processor. The method may further comprise displaying an output of the cross correlation processor.

In one embodiment, the method may comprise providing that the plurality of beam outputs comprise a narrowband signal, a wideband signal, and ambient noise signal. The method comprises suppressing the narrowband signal while passing the wideband signal and the ambient noise signal to the cross correlation processor.

In other words, the system provides for a plurality of adaptive filters for receiving the plurality of beam outputs, wherein each of the plurality of adaptive filters may comprise a finite impulse response filter, a plurality of delay components for the plurality of adaptive filters, and a plurality of signal combiners for the plurality of adaptive filters.

BRIEF DESCRIPTION OF THE DRAWINGS

A more complete understanding of the invention and many of the attendant advantages thereto will be readily appreciated as the same becomes better understood by reference to the following detailed description when considered in conjunction with the accompanying drawing wherein corresponding reference characters indicate corresponding parts throughout several views of the drawings and wherein.

BRIEF DESCRIPTION OF THE PREFERRED EMBODIMENTS

An adaptive cross-correlator in accord with the present invention preferably uses an adaptive time domain notch filter at the input to the cross-correlator. One significant advantage of the present invention is a significant reduction in computations required during operation. In the present invention, the number of floating point operations required per update are of order M×P where P is the number of filter coefficients which is typically 15 or less and M is the number of beam pairs. An adaptive cross-correlator in accord with the present invention can therefore provide a significant reduction in processing throughput requirements as compared to the aforementioned SCOT method. Moreover, it has been shown that in the presence of noise and wide band signals only, SCOT will have reduced performance over a cross-correlator without SCOT that an adaptive cross-correlator in accord with the present invention will perform no worse than the standard cross-correlator in the presence of wide band signals and noise.

Figure 1:
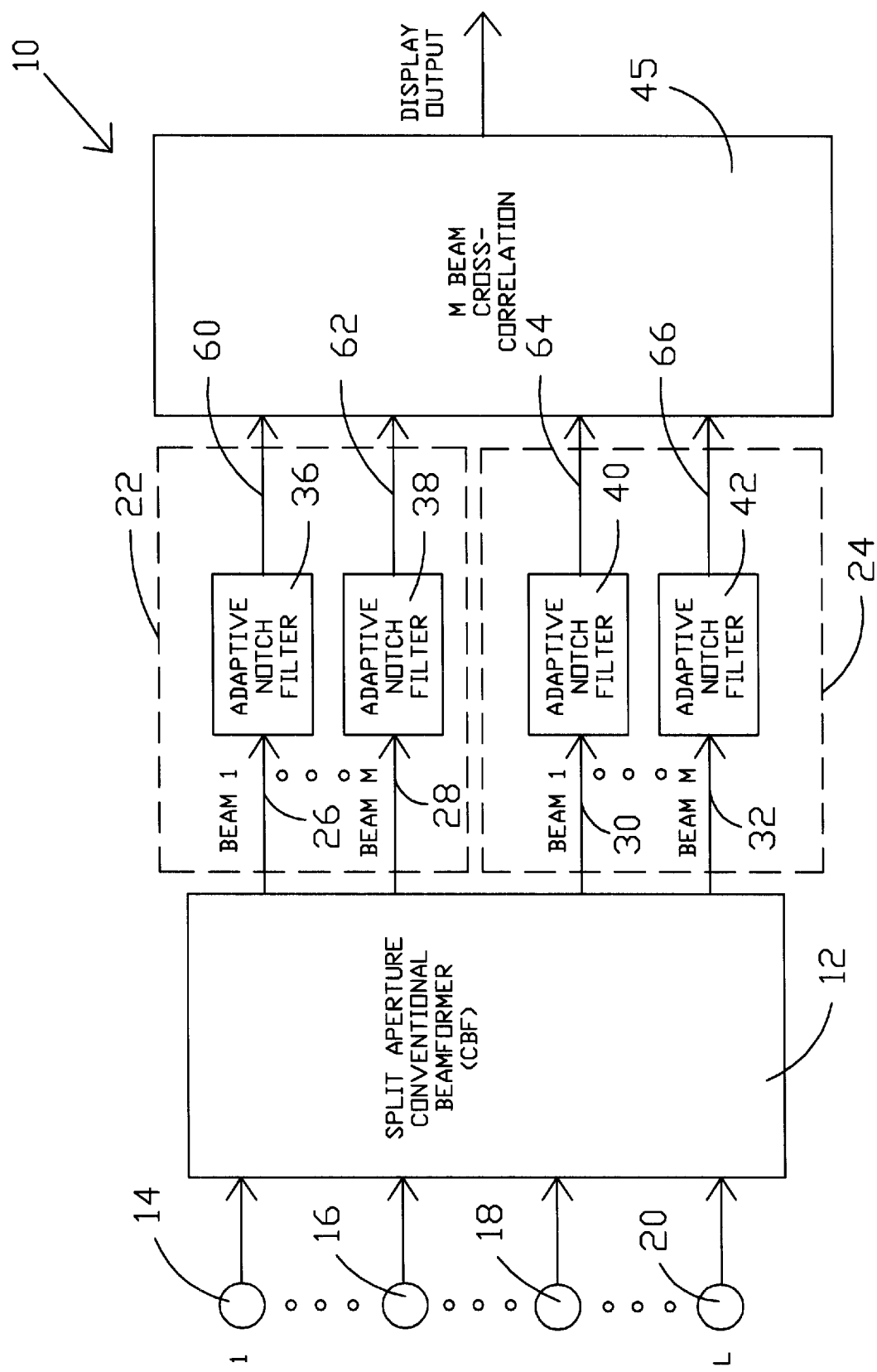
FIG. 1 is a block diagram schematic showing a presently preferred configuration of a sonar signal processing system in accord with the present invention.

Referring now to FIG. 1, there is shown a block diagram of system 10 in accord with a presently preferred embodiment of the invention that provides an adaptive cross-correlator as indicated therein. Beamformer 12 may be a conventional beamformer utilized with a plurality of sensor inputs such as sonar sensor inputs 14, 16, 18, and 20 which may represent from 1 to L sonar sensor inputs. Electronic beamformers may be used with arrays of hydrophones including omidirectional hydrophones to achieve a desired array gain.

In accord with a presently preferred embodiment of the present invention, beamformer 12 produces multiple beam outputs and preferably, provides at least two sub aperture beam sets 22 and 24. Beam sets 22 and 24 present a conventional grouping of beams such as those from the left side sensors and the right side sensors. Each sub aperture comprises a plurality of beam outputs from 1–M, such as indicated at 26, 28, 30 and 32. Thus, the beam outputs of a preferably split aperture conventional beamformer 12 are provided as inputs to a plurality of adaptive notch filters as indicated by 36, 38, 40, and 42. The outputs of the plurality of adaptive notch filters may be applied to a conventional cross correlation process as indicated at 45 in accord with the present invention.

Figure 2:
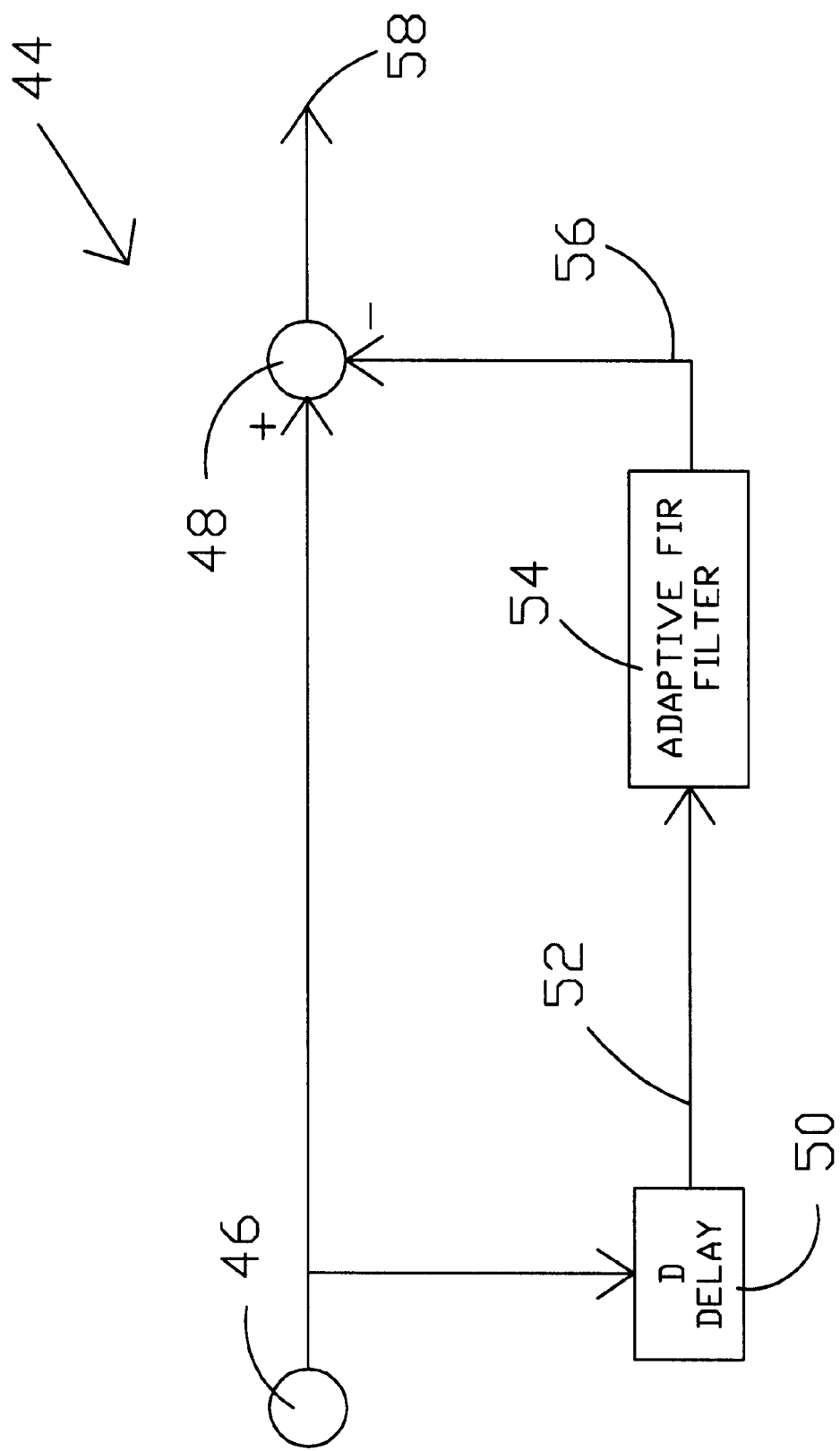
FIG. 2 is a block diagram schematic showing a presently preferred adaptive notch filter for use in the system of FIG. 1.

FIG. 2 illustrates a block diagram for an adaptive notch filter 44 in accord with the present invention which may be used for each of the adaptive notch filters as indicated at 36, 38, 40, and 42. The assumed input signal 46, x(n), to adaptive notch filter 44, which corresponds to beam outputs 26–32, may comprise one or more narrowband lines. The desired wideband signal with ambient noise and may be expressed as:

$$X(n)=S_{NB}(n)+W(n)+N(n) \quad (4)$$

where:

$S_{NB}(n)$=Narrowband Signal,
W(n)=Wideband Signal, and
N(n)=Ambient Noise.

Input signal 46 is sent directly to a signal combiner element such as adder 48. A delayed version of input signal 46, produced by delay circuit 50, is sent to adaptive finite impulse response (FIR) filter 54. Signal 52 produced by delay circuit 50 may be expressed as:

$$X(n-D)=S_{NB}(n-D)+W(n-D)+N(n-D) \quad (5)$$

The delay D of delay circuit 50 is selected to de-correlate the wideband and ambient noise from the un-delayed version of the signal. In other words, D is chosen sufficiently large that the signals $W(n)$ and $W(n-D)$, and $$N(n) \text{ and } N(n-D) \quad (6)$$

are uncorrelated. By "uncorrelated," it is meant that the delay, D, avoids suppression of the signal when it is subtracted from itself.

FIR filter output 56 may be expressed as follows;

$$\hat{S}_{NB}(n) = \sum_{k=0}^{P-1} h(k) * x(n-k-D). \quad (7)$$

FIR filter output 56 is an estimation of the narrowband signal which is to be removed from the beam outputs 26–32 in accord with the present invention. FIR filter 54 preferably has P taps or filter coefficients h(k). The tap weights are recursively estimated using the least mean squared (LMS) method as follows:

$$h_n(k)=h_{n-1}(k)+\Delta*(x(n)-\hat{S}_{NB}(n))*x(n-k-D), \quad (8)$$

where $$0<\Delta<1/(N*10*\sigma_x^2) \quad (9)$$

where $\sigma_x^2$ is an estimate of power in input signal x(n).

Thus, the above equation illustrates the adaptive FIR filter equations and the LMS technique which is preferably utilized in accord with the present invention. Filter output 56, or $\hat{S}_{NB}(n)$, provides the narrowband interference, which is then subtracted from the un-delayed version of the input signal with a signal combiner such as adder 48. Resultant output signal 58 is a narrowband free or narrowband suppressed signal, and may effectively be described as:

$$W(n)+N(n) \quad (10)$$

Thus, respective outputs 60, 62, 64, and 66 shown in FIG. 1 of the plurality of adaptive notch filters 36–42, each of which is calculated as per output signal 58 of FIG. 2, are effectively narrowband free or narrowband suppressed beam output signals that are then utilized by standard cross correlation processor 45.

Figure 3:
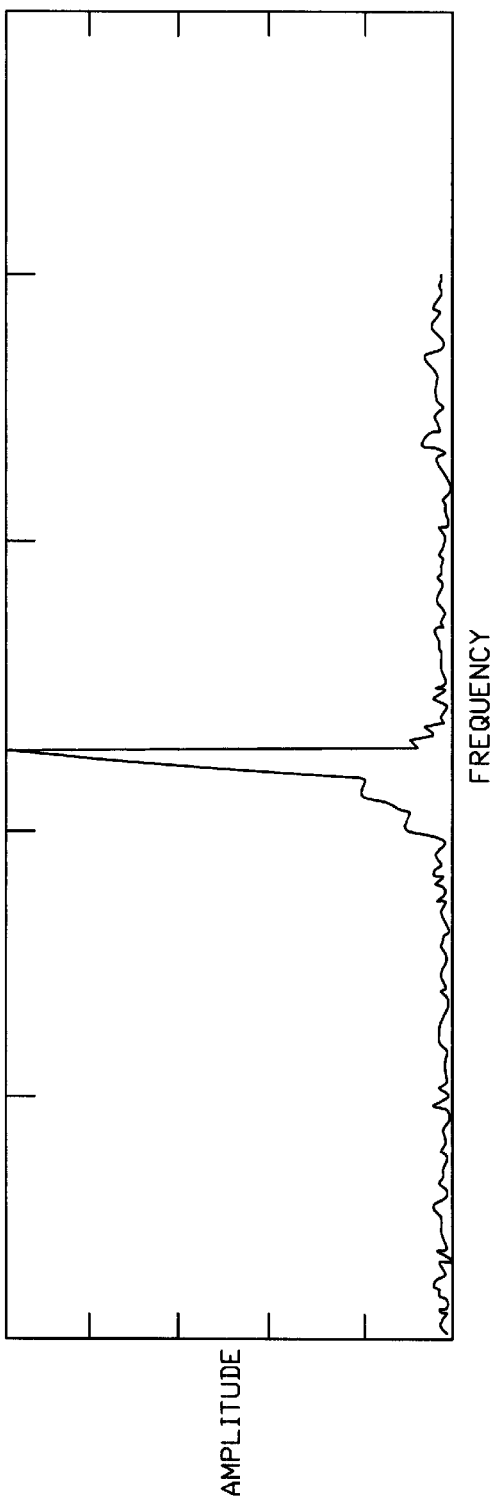
FIG. 3 is a diagram of raw data prior to filtering with the filter system of the present invention depicted by FIG. 1 and FIG. 2.
Figure 4:
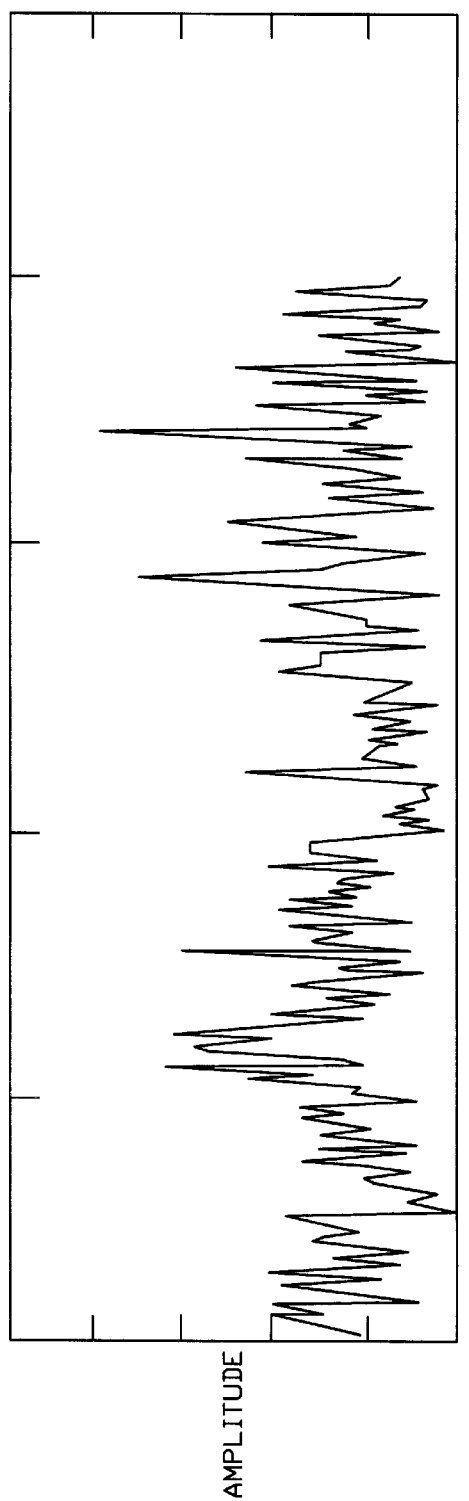
FIG. 4 is a diagram of filtered data after filtering.

FIG. 3 and FIG. 4 show the result of the above described processing. FIG. 3 provides a frequency domain graph of a beam output signal comprising a narrowband signal in ambient noise. FIG. 4 shows the filtered version of the signal. In the example of FIG. 3 and FIG. 4, the filter consists of 15 taps. In experimental results, the narrowband signal was suppressed by 13 dB.

The present invention therefore provides advantages and expected performance gains. For instance, the present invention may be utilized to suppress narrowband interference from, for instance, ownship and loud, distant shipping. The present invention may be utilized to suppress electronic noise found on towed arrays. The present invention may be utilized to improve performance of cross correlation processor 45 against wideband signals corrupted with loud narrowband interference. The present invention may be utilized to improve performance over SCOT methods in the presence of only wideband signals and ambient noise. Moreover, the present invention is computationally more efficient than SCOT methods.

In summary, the present invention provides a plurality of adaptive notch filters 36–42 which operate on a plurality of beams 26–32. Each adaptive filter 44 operates without the need for feedback from cross-correlator processor 45 and without any prior knowledge of the expected process output. The filter weights adapt based on the acoustic output of beamformer towed array beams, hull array beams or spherical array beams. The purpose of adaptive notch filter 44 is to suppress high signal to noise ratio narrow band interference while preserving the broadband energy before the outputs, such as outputs 60–66, enters the cross-correlation process. The narrowband interference removal will improve the sonar operator's detection capability for broadband targets.

It will be understood for purposes of implementation that system 10 may comprise one or more microprocessors, one or more programmable integrated circuits, one or more microcomputers, one or more processors, and/or one or more suitably small programmable computers. It will be appreciated by those skilled in the art that the invention could be implemented for testing and/or operation using one or more suitable programmed general purpose computers and/or special purpose hardware, with program routines or logical-circuit sets performing as processors. Such routines or logical circuit sets may also be referred to as processors or the like.

Therefore, it will be understood that many additional changes in the details, materials, steps and arrangement of parts, which have been herein described and illustrated in order to explain the nature of the invention, may be made by those skilled in the art within the principle and scope of the invention as expressed in the appended claims.

What is claimed is:

1. A cross correlation system for an array of sensors comprising:

a beamformer joined to said array of sensors for receiving data and forming the data into a plurality of beams;

a plurality of filter systems, each filter system joined to receive one beam from said beamformer, said beam having a wideband signal component of interest and a narrowband component, each said filter system comprising:

a delay element joined to receive the beam and to delay the beam to provide a delayed beam, said delay element delaying the beam sufficiently to decouple the wideband signal component of interest from an undelayed wideband signal component of the beam;

an adaptive notch filter joined to said delay element for receiving said delayed beam, said adaptive notch filter filtering the wideband signal component of said delayed beam and providing a delayed, filtered beam;

an adder joined to the beamformer to receive the beam and joined to the adaptive notch filter to receive the delayed, filtered beam, said adder subtracting the delayed, filtered beam from the beam and providing a filtered beam; and a cross correlator joined to each filter system for receiving said filtered beams and producing cross correlated output data.

2. The system of claim 1 wherein said adaptive notch filter is a finite impulse response filter.

3. The system of claim 2 wherein said finite impulse response filter estimates the narrowband component of the delayed beam and filters the wideband component of the delayed beam.

4. The system of claim 2 wherein each said finite impulse response filter has a filter output of the form:

$$\hat{S}_{NB}(n) = \sum_{k=0}^{P-1} h(k) * x(n-k-D),$$

wherein:

$\hat{S}_{NB}$ is the narrowband component of the delayed beam;

h (k) are a plurality of preselected filter coefficients;

x (n) is the beam; and

D is the delay provided by the delay element.

5. The system of claim 4 wherein said adaptive notch filter estimates signal power, $\sigma_x^2$, for the beam, and iteratively computes the plurality of preselected filter coefficeients using the least mean squares method to give $\Delta$ based on the number of samples N wherein filter coefficients have the form:

$$h_n(k) = h_{n-1}(k) + \Delta * (x(n) - \hat{S}_{NB}(n)) * x(n-k-D)$$

such that $$0 < \Delta < 1/(N * 10 * \sigma_x^2).$$

6. The system of claim 1 wherein:

said beamformer is a split aperture beamformer said array of sensors having a first aperture and a second aperture and said beamformer forming the data into a plurality of first aperture beams and a plurality of second aperture beams;

said plurality of filter systems being organized into a first bank of filter systems each joined to receive one beam from said plurality of first aperture beams producing filtered first aperture beams, and a second bank of filter systems each joined to receive one beam from said plurality of second aperture beams producing filtered second aperture beams; and said cross correlator joined to said first bank of filter systems and said second bank of filter systems and cross correlating said filtered first aperture beams with said filtered second aperture beams.

7. A cross-correlation method for an array of sensors comprising:

receiving data from the array of sensors;

forming the data into a plurality of beams;

fitering said plurality of beams with a plurality of filter systems wherein each filter system receives one beam from said beamformer, each of said beams having a wideband signal component of interest and a narrowband component;

delaying each of said beams sufficiently to decouple the wideband signal component of interest with respect to a wideband signal component in a delayed beam for each of said plurality of beams;

filtering the wideband signal component of said delayed beam with an adaptive notch filter to produce a delayed, filtered beam for each of said plurality of beams;

subtracting the delayed, filtered beam from the beam to provide a filtered beam for each of said plurality of beams; and cross correlating each filtered beam of said plurality of beams for producing cross correlated output data.

8. The method of claim 7 wherein said step of filtering further comprises utilizing a finite impulse response filter.

9. The method of claim 8 further comprising estimating the narrowband component of the delayed beam for filtering with respect to the wideband component of the delayed beam.

10. The method of claim 8 further comprising providing that said finite impulse response filter has a filter output of the form:

$$\hat{S}_{NB}(n) = \sum_{k=0}^{P-1} h(k) * x(n-k-D),$$

wherein:

$\hat{S}_{NB}$ is the narrowband component of the delayed beam;

h (k) are a plurality of preselected filter coefficients;

x (n) is the beam; and

D is the delay provided by the delay element.

11. The method of claim 10 further comprising estimating signal power, $\sigma_x^2$, for the beam, and iteratively computing the plurality of preselected filter coefficeients using the least mean squares method to give $\Delta$ based on the number of samples N wherein the preselected filter coefficients have the form:

$$h_n(k)=h_{n-1}(k)+\Delta*(x(n)-\hat{S}_{NB}(n))*x(n-k-D)$$

such that $$0<\Delta<1/(N*10*\sigma_x^2).$$

12. The method of claim 7 further comprising:

utilizing a beamformer for said step of receiving data and forming the data into a plurality of beams;

providing that said beamformer is a split aperture beamformer having a first aperture and a second aperture;

forming the data into a plurality of first aperture beams and a plurality of second aperture beams;

organizing said plurality of filter systems into a first bank of filter systems each receiving one beam from said plurality of first aperture beams producing filtered first aperture beams, and a second bank of filter systems each receiving one beam from said plurality of second aperture beams producing filtered second aperture beams; and cross correlating said filtered first aperture beams with said filtered second aperture beams.

* * * * *